United States Patent
O'Hara et al.

(10) Patent No.: US 8,510,172 B2
(45) Date of Patent: Aug. 13, 2013

(54) ELECTRONIC PUBLISHING FORUM

(76) Inventors: Eileen O'Hara, Tarzana, CA (US);
Barbara J. Bustamante, Saint George, UT (US); Roy C. Womack, Carrollton, TX (US)

( * ) Notice: Subject to any disclaimer, the term of this patent is extended or adjusted under 35 U.S.C. 154(b) by 0 days.

(21) Appl. No.: 13/467,822

(22) Filed: May 9, 2012

(65) Prior Publication Data
US 2013/0066746 A1  Mar. 14, 2013

Related U.S. Application Data

(60) Provisional application No. 61/533,471, filed on Sep. 12, 2011.

(51) Int. Cl.
*G06Q 30/00* (2012.01)

(52) U.S. Cl.
USPC ......................................... 705/26.1; 705/27.1

(58) Field of Classification Search
USPC ............................................... 705/26.1, 27.1
See application file for complete search history.

(56) References Cited

U.S. PATENT DOCUMENTS
7,249,107 B2 *  7/2007  Yaacovi ........................ 705/59
2007/0186230 A1 *  8/2007  Foroutan ....................... 725/24

OTHER PUBLICATIONS

"Group wants to build cohesive voice for arts" Anonymous. Telegraph-Journal [Saint John, N.B] Feb. 19, 2010: C.3., downloaded from ProQuestDirect on the Internet on May 29, 2013, 2 pages.*

* cited by examiner

*Primary Examiner* — James Zurita
(74) *Attorney, Agent, or Firm* — James A. Italia; Italia IP

(57) ABSTRACT

A website for bringing together for communications purposes creators of publishable art, publishers of publishable art, and consumers of publishable art using the internet. The website may have a page for the creating artists including a forum for discussion by general consumers, a newsletter, direct emailing, and a link to social networks. Publishers may have a page for publicizing their sponsored creators, selling publishable art, and other purposes. General consumers may review and discuss with other consumers, displayed or advertised publishable art, post reviews, ratings, and recommendations, sell used publishable art, purchase hard version or electronic publishable art, and post and watch videos. Art in electronic form carries enabling authorization issued by the website. Resale of art previously purchased from the website revokes authorization from the original purchaser.

4 Claims, 3 Drawing Sheets

FIG. 2

ELECTRONIC PUBLISHING FORUM

CROSS REFERENCE TO RELATED APPLICATION

This application claims the benefit of the filing date under 35 USC 119(e) of the filing date of U.S. Provisional Application Ser. No. 61/533,471, filed Sep. 12, 2011, the contents of which are incorporated herein.

FIELD OF THE INVENTION

The present invention relates to the field of electronic publishing, and more particularly to a system for bringing together creators of publishable media, publishers of publishable media, and consumers of publishable media using the internet.

BACKGROUND OF THE INVENTION

Forms of art and performance, such as writings, music, dance, acting, plays, motion pictures, painting and graphics, sculpting, and all sorts of diverse artwork have long existed. These forms of art and performance, which will be referred to representatively as publishable media hereinafter, have long been presented to the public at venues specific to each. For example, books have provided access to writings and to the script aspects of plays, motion pictures, and the like. Physical displays of painting, graphics, sculpture and other artistic objects have been provided in a physical, or "bricks and mortar" building or the like.

The advent of electronic communications, such as radio and television, and then later, the internet, has expedited public access to publishable media. However, even with the internet, interactive participation among creators, distributors, and consumers of publishable media has never been provided in a suitable way.

SUMMARY OF THE INVENTION

The present invention addresses the above stated need by providing a single forum for bringing together the three major constituencies of the world of publishable media. Using the internet as a communications channel, the present invention provides not only general purpose access to publishable media, but also immediate access between the various participants in a way allowing each to make their respective contributions to the others, while enabling participant-to-participant communication in an immediate, convenient way that was absent from prior presentations of publishable media to the public.

Obviously, visible and audible created content may be presented to the public. However, the forum of the present invention further enables creators and commercial distributors of the created content to interact in furtherance of both creation of content and also its dissemination. Also, members of the public, or consumers of created content, may have unprecedented access to content, creators of that content, disseminators of that content, and to one another. This is enabled at a single forum, presented as a website, that offers pre-existing avenues of access depending upon the particular focus of the user.

Pre-existing avenues of access may utilize up-to-date communications advances, notably, portable telecommunications and data processing devices, such as smartphones in all variations thereof. Thus, a person can have immediate access from almost any geographic location and at any time to created content and those involved with created content.

The various constituencies are not limited to creators, commercial disseminators, and consumers of created content, but also to educational aspects furthering created content. That is, students and teachers of created content may participate in this vastly improved communication and dissemination of created content in their respective learning and teaching roles.

An important feature of the invention is enabling authorization which is conferred on the purchaser of art in electronic form. Should the purchaser sell previously purchased art in electronic form, the authorization is revoked. This protects the publisher and artist from illicit recopying of art works.

It is an object of the invention to provide a single location or forum where creators, commercial and other disseminators, consumers, students, and teachers of publishable media may come together for the purpose of creating, contributing to creation of, disseminating, enjoying, and discussing content, creation, and dissemination of publishable media.

Another object of the invention is to protect the publisher and artist from illicit recopying of art works.

A further object of the invention is to expedite communications among and expedite the functions of creators, commercial and other disseminators, consumers, students, and teachers of publishable media, using the internet and portable data processing enabled telecommunications devices.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a representation of a home page of a website according to one implementation of the invention.

FIG. 2 is a representation of another page of the website according to a further implementation of the invention.

FIG. 3 is a block diagram summarizing steps of a method of operating an interactive website according to the present invention.

DETAILED DESCRIPTION

The present invention may be regarded as a method which is implementable on internet enabled data processing devices, for bringing together for communications purposes creators of publishable art, publishers of publishable art, and consumers of publishable art using the internet. Internet enabled data processing devices include desktop and laptop personal computers, tablets, smart phones, and the like, including products known as iPhone®, iPod®, Blackberry®, Kindle®, Nook® by way of example and not limitation. Publishable art may include writings such as books, novels, short stories, articles and others, paintings, graphics, and other image based media, and dynamic media, such as movies, audio, and video for recording dance, music, public speaking, acting, lectures, and diverse presentations, to name but a few. All of these forms of art works may be reproduced and disseminated in electronic format which is downloaded to an internet enabled data processing device of the type described above.

Figure 1:
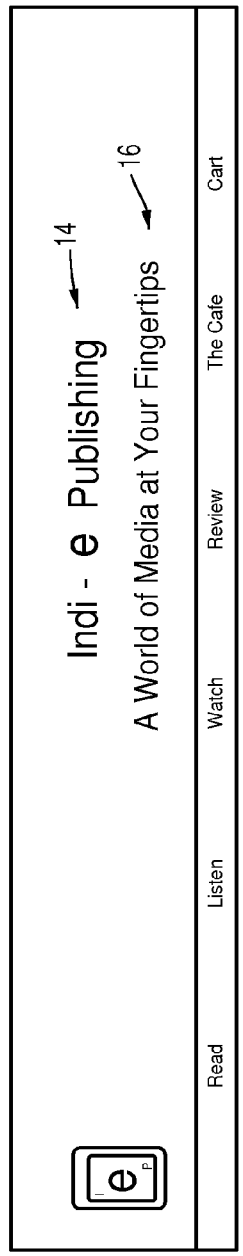

Use of an internet enabled data processing device may be used to access a website according to the present invention. An exemplary home page 10 of the website is shown in FIG. 1. The home page may display a logo 12 indicative of the organization sponsoring the website, a legend 14 identifying the sponsoring organization, a legend 16 summarizing or representing the purpose of the website, and a number of clickable options 18, 20, 22, 24, 26 for advancing the person accessing the website to a desired page of the website, among other legends. The legend 14 in this case identifies Indi-e Publishing LLC as the operator or sponsor of the website. The legend 16 summarizes the overall product of electronic media. The clickable options 18 and 24 enable members of the public to subscribe and attain certain privileges associated with membership, and to sign in to advance to various pages of the website. The clickable option 20 enables a member of the public to obtain a newsletter which may be electronically disseminated by the website to subscribers. The clickable option 22 may enable a subscriber to advance to a discussion forum which is open to subscribers. The clickable option 26 may present email addresses, hyperlinks, telephone number, physical street addresses, and other ways to contact the operators of the website.

The website may offer further options, such as ways to access readable textual content, audio content, video content, to interactively participate in forums soliciting commentary and other inputs, and ways to purchase art works which are available for purchase through the website.

Art works which are available for purchase may be advertised on various pages of the website by publishers of publishable art, directly by artists, or creators of publishable art, or as resale by subscribing members of the public who have purchased art works using the website and wish to sell the same.

Preferably, various pages of the website may include an artist profile page, which may for example present biographical information, artist generated videos, commentary by fans and other subscribers to the website, and links to specific artistic products of an individual artist, among other possibilities.

The website may offer product profile pages featuring description of the art works, and commentary from the subscribing public, which may be interactive. For example, subscribers may read and write reviews, rate artistic products, and purchase art works through the website at a product profile page.

The website may feature a patron roster, or a list of purchasers of art work.

The website may present a page dedicated to use as a forum wherein artists and subscribing members of the public may interact with one another. This page may also feature broadcasting or podcasting of artistic performances in real time for example, and also of recorded prior performances.

The website may present pages directed to educational aspects of art works and diverse resources, such as writing workshops, publishing and production resources, image consultants, upcoming conferences, and opportunities to appear in newsletters and in other ways. The website may issue a virtual newsletter which is emailed to subscribers, made available for rss feed, posted as a link on social networking sites, and linked to industry publications and events.

The website may introduce new artists, promote artistic media, and scheduled events, and may present articles written by authors and professionals in the world of art works and publishing. Publicity may be leveraged by offering chat rooms, message boards and in other ways. Viral advertisement may be implemented through blogging, vlogging, YouTube®, and email recommendations.

The website may host online seminars, may implement automated direct email marketing, and may offer services such as editing and formatting for publishing.

The website may present hyperlinks to social networks such as Facebook®, Twitter®, and LinkedIn®.

The website may offer places to sell both new and used artistic media including hard copies (e.g., physical books).

The website may offer software applications which are downloadable to smart phones, tablets, portable and desktop personal computers, and the like, which will give those devices ability to read, display, and play any electronic media type.

Figure 2:
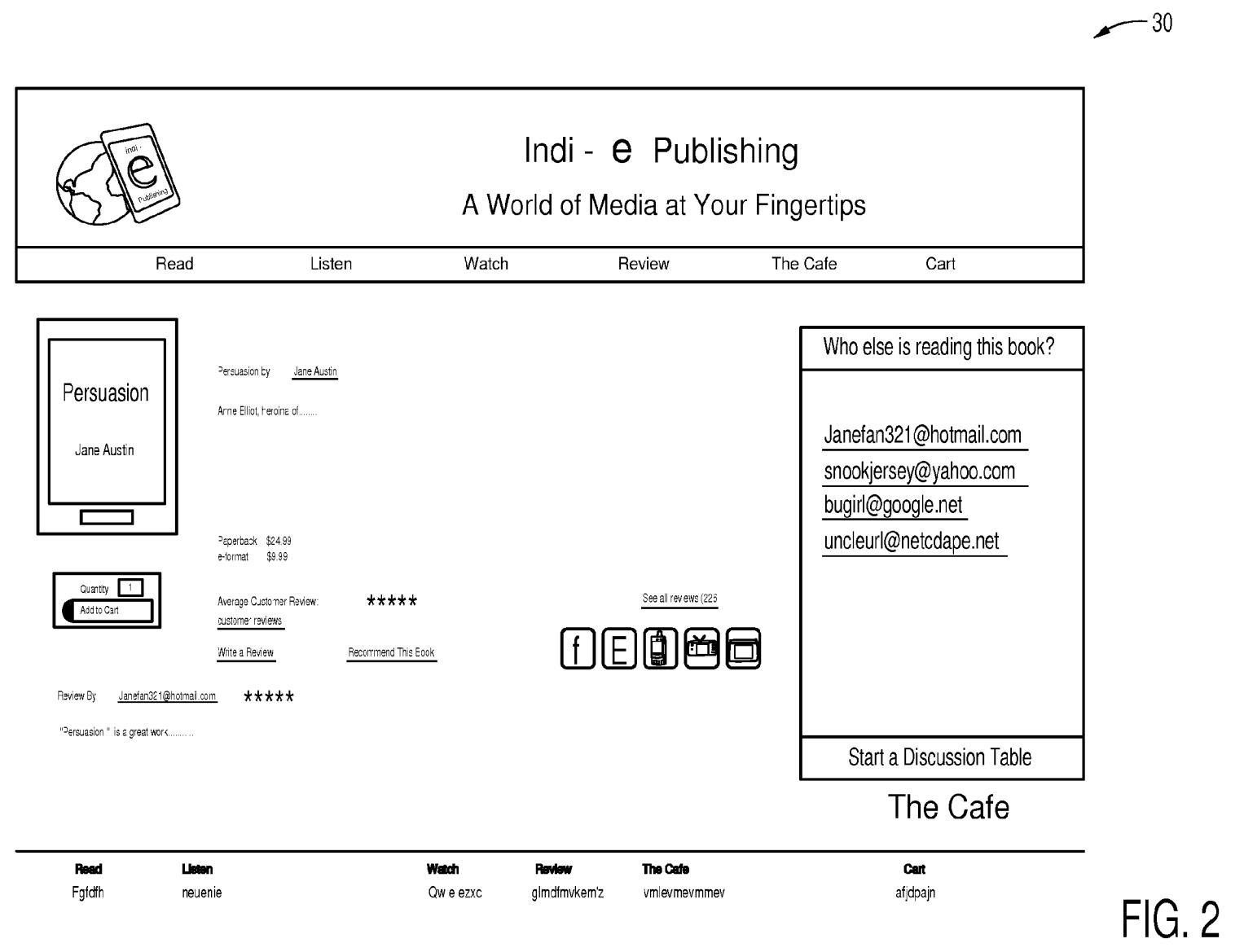

FIG. 2 shows a sample website page 30 which in the present example is directed to advertising both hard copies (e.g., paperback) and electronic format of the novel Persuasion, by the author Jane Austen. In the website page 30, the book is briefly summarized and annotated. Options are made available for interactive selection by subscribed members of the public to purchase, write and read reviews, recommend the book, rate the artistic product, and schedule and participate in real time discussions with other members.

Figure 3:
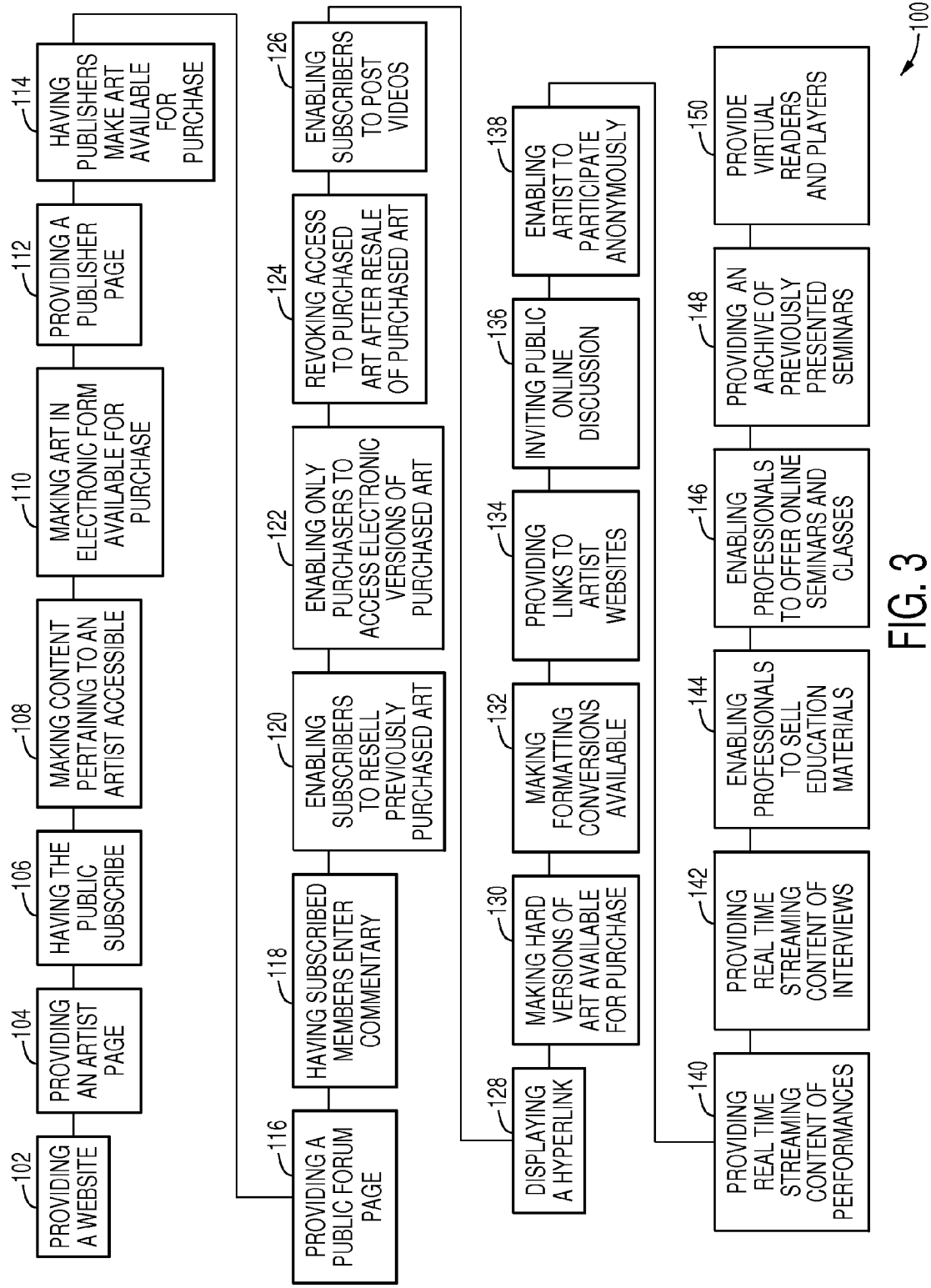

Turning now to FIG. 3, with the concept of the novel website now set forth, a method 100 for bringing together for communications purposes creators of publishable art, publishers of publishable art, and consumers of publishable art using the internet will be described. Steps of the method 100 will be understood to refer back to and incorporate, where appropriate, characteristics of the website described priorly.

The method 100 may comprise a step 102 of providing an website which is restricted in access to subscribers to the website. In one implementation of the invention, subscribers are charged a fee for their subscription. The method 100 may comprise a step 104 of providing the website with an artist page, a step 106 of having members of the public subscribe to and access the website, a step 108 of making accessible on the artist page of the website content including at least one of facts pertaining to at least one individual artist, such as biographic information, description of publishable art created by the artist, and published reaction by subscribed members of the public to the publishable art created by the artist. Reaction by subscribed members may take the form of opinions, ratings, and the like. The method 100 may comprise a step 110 of making the publishable art in electronic form created by the artist available for purchase to subscribed members of the public on the website by uploading from the website to an electronic device in the possession of the subscribed member purchasing the publishable art. It would be possible to effect data transfer from one electronic device for downloading to a second device if desired. For example, a subscriber away from home may utilize a smartphone to order artwork, and to specify download to a personal computer at home, for example.

The method 100 may comprise a step 112 of providing the website with a publisher page and a step 114 of having publishers of publishable art make publishable art available for purchase on the website by uploading from the website. This could be implemented on the publisher page for example.

The method 100 may comprise a step 116 of providing the website with a public interactive forum page, a step 118 of having subscribed members of the public enter commentary on the public forum page, and a step 120 of enabling the subscribed members of the public offer previously purchased publishable art from the website for resale on the website.

In a particularly important feature, the method 100 may comprise a step 122 of causing the website to institute authorization which enables art in electronic versions purchased on the website to be enabled and accessed for the purchaser and only for the purchaser. This may be implemented by requiring special reader or player software that comes with subscription, by requiring a dedicated physical reader or player available through the website, by embedding controlling software in the sold product or otherwise embedding encryption and disablement with the sold product, or in any other suitable way.

The method 100 may comprise a step 124 of causing the website to revoke authorization instituted in the step 122 for any purchaser of art in electronic versions purchased on the website when that purchaser sells the purchased art on the website. This step protects the author or publisher from unauthorized copying of the art work.

The method 100 described thus far may be augmented by additional steps which for example, further the appeal, utility, and power of the website and its use. For example, the method 100 may comprise a step 126 of enabling subscribed members of the public post their individual videos on the website. The method 100 may comprise a further step 128 of displaying on the website at least one hyperlink to at least one social network. This may be used to export commentary about a work of art to the affected social network, to export advertising content, or other content pertaining to art work or an artist.

The website need not be limited to electronic media. Again considering FIG. 2, it will be seen that the subject book is shown to have one price for a hard copy of the book and a second price for an electronic format or version of the same book. This accommodates both traditional and modern tastes in reading. Therefore, the method 100 may comprise a step 130 of making hard versions of publishable art created by at least one of the artists having an artist page available for purchase from the website. Hard versions will obviously be understood to refer to hard or soft cover books, but also prints and other artworks in their physical form, such as tapestries, three dimensional sculpture, and the like.

The website may be arranged to promote self-publishing by prospective authors of art. To assist novices in this process, the method 100 may comprise a further step 132 of making formatting conversions available to subscribed members of the public available via the website, thereby assisting subscribed members of the public to become artists creating publishable art.

To accommodate establishment of personal websites by artists, the method 100 may comprise the further step 134 of providing links to art created by one of the artists on the website. The website may institute a royalty system or other compensation arrangement to derive income from sales which originated at the website but which culminated or were fully implemented at another website or by another means, should the link to another website come into play.

To enhance the experience of subscribers, the method 100 may comprise the further step 136 of providing a web page which invites subscribed members of the public to participate in an online discussion forum. In a further evolution of the discussion forum, the website may comprise a further step 138 of enabling artists having artist pages to participate anonymously in discussions at the online discussion forum.

The method 100 may comprise the further step 140 of providing real time streaming of performance content on the website. Additionally, the method 100 may comprise the further step 142 of providing real time streaming of interviews of artists having artist pages on the website.

As a supplement to presentation and promotion by artists, either directly or through publishers, the website may promote education related to art works and artists. Therefore, the method 100 may comprise the further step 144 of enabling professionals in the field of education to offer educational materials for sale via upload on the website. Additionally, the method 100 may comprise the further step 146 of enabling professionals in the field of education to offer online seminars and interactive classroom sessions on the website. Still further, the method 100 may comprise the further step 148 of providing an archive of previously presented seminars on the website. Education related activities may for example be presented on web pages specifically dedicated to educational issues.

To enable users to utilize their existing smartphones and other internet enabled data processing devices to improve convenience in accessing the website, the method 100 may comprise the further step 150 of providing virtual reader players and virtual reader devices usable with the website.

FIGS. 1 and 2 are presented purely in representative capacity to visually emphasize to the reader the focus of the invention as pertaining to reproducible works of art. Obviously, other forms of art works may be similarly presented to subscribers to the website.

The steps presented herein may be varied from the order as presented where feasible, and may also be practiced selectively in any feasible combination. No inference should be made that because all of the steps are depicted as being connected in FIG. 3 that they must all necessarily be present when practicing the invention or that they may only occur in the order presented herein.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

We claim:

1. A method which is implementable on internet enabled data processing devices, for bringing together for communications purposes artists who are creators of publishable art, publishers of publishable art, and consumers of publishable art using the internet, where publishable art includes at least one of writings, music, dance, acting, plays, motion pictures, painting and graphics, and sculpting, comprising the steps of:

providing an website which is restricted in access to subscribers to the website;

providing the website with an artist page;

having members of the public subscribe to and access the website;

making accessible on the artist page of the website content including at least one of facts pertaining to at least one individual artist, description of publishable art created by the artist, and published reaction by subscribed members of the public to the publishable art created by the artist;

making the publishable art in electronic form created by the artist available for purchase to subscribed members of the public on the website by downloading from the website to an electronic device in the possession of the subscribed member of the public purchasing the publishable art;

providing the website with a publisher page;

having publishers of publishable art make publishable art available for purchase on the website by uploading from the website;

enabling artists having artist pages to participate anonymously in discussions at the online discussion forum;

making hard versions of publishable art created by at least one of the artists having an artist page available for purchase from the website;

providing links to art created by one of the artists on the website;

making formatting conversions available to subscribed members of the public available via the website, thereby assisting subscribed members of the public to become artists creating publishable art;

enabling subscribed members of the public post their individual videos on the website;

enabling professionals in the field of education to offer educational materials for sale via download from the website;

enabling professionals in the field of education to offer online seminars and interactive classroom sessions on the website;

providing an archive of previously presented seminars on the website providing the website with a public forum page;

having subscribed members of the public enter commentary on the public forum page;

enabling the subscribed members of the public offer previously purchased publishable art from the website for resale on the website;

providing real time streaming of performance content on the website;

providing real time streaming of interviews of artists having artist pages on the website;

causing the website to institute authorization which enables art in electronic versions purchased on the website to be enabled and accessed for the purchaser and only for the purchaser; and causing the website to revoke authorization for any purchaser of art in electronic versions purchased on the website when that purchaser sells the purchased art on the website.

2. The method of claim 1, comprising the further step of displaying on the website at least one hyperlink to at least one social network.

3. The method of claim 1, comprising the further step of providing a web page which invites subscribed members of the public to participate in an online discussion forum.

4. The method of claim 1, comprising the further step of providing virtual reader players and virtual reader devices usable with the website.

* * * * *